Patented Oct. 10, 1922.

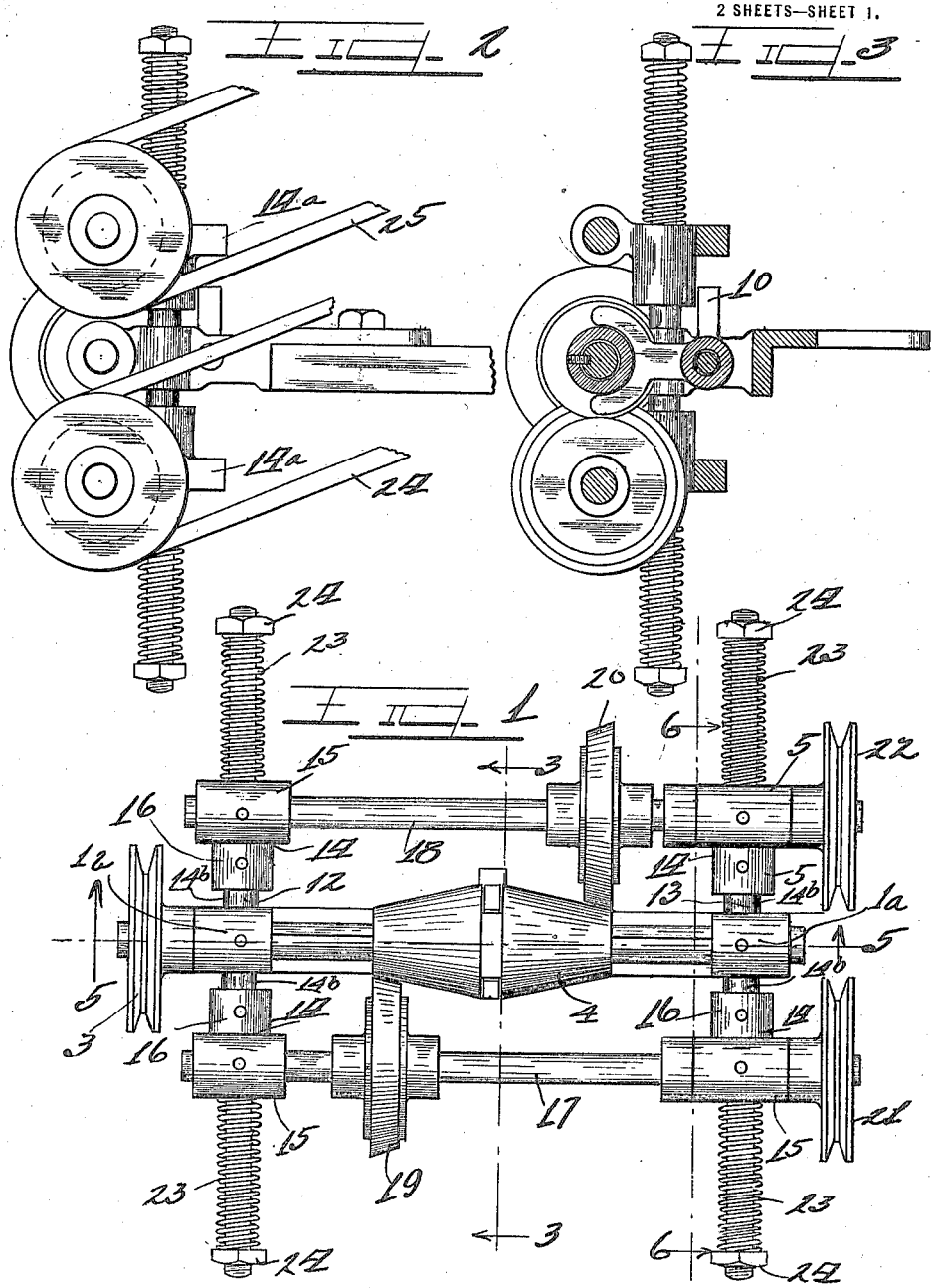

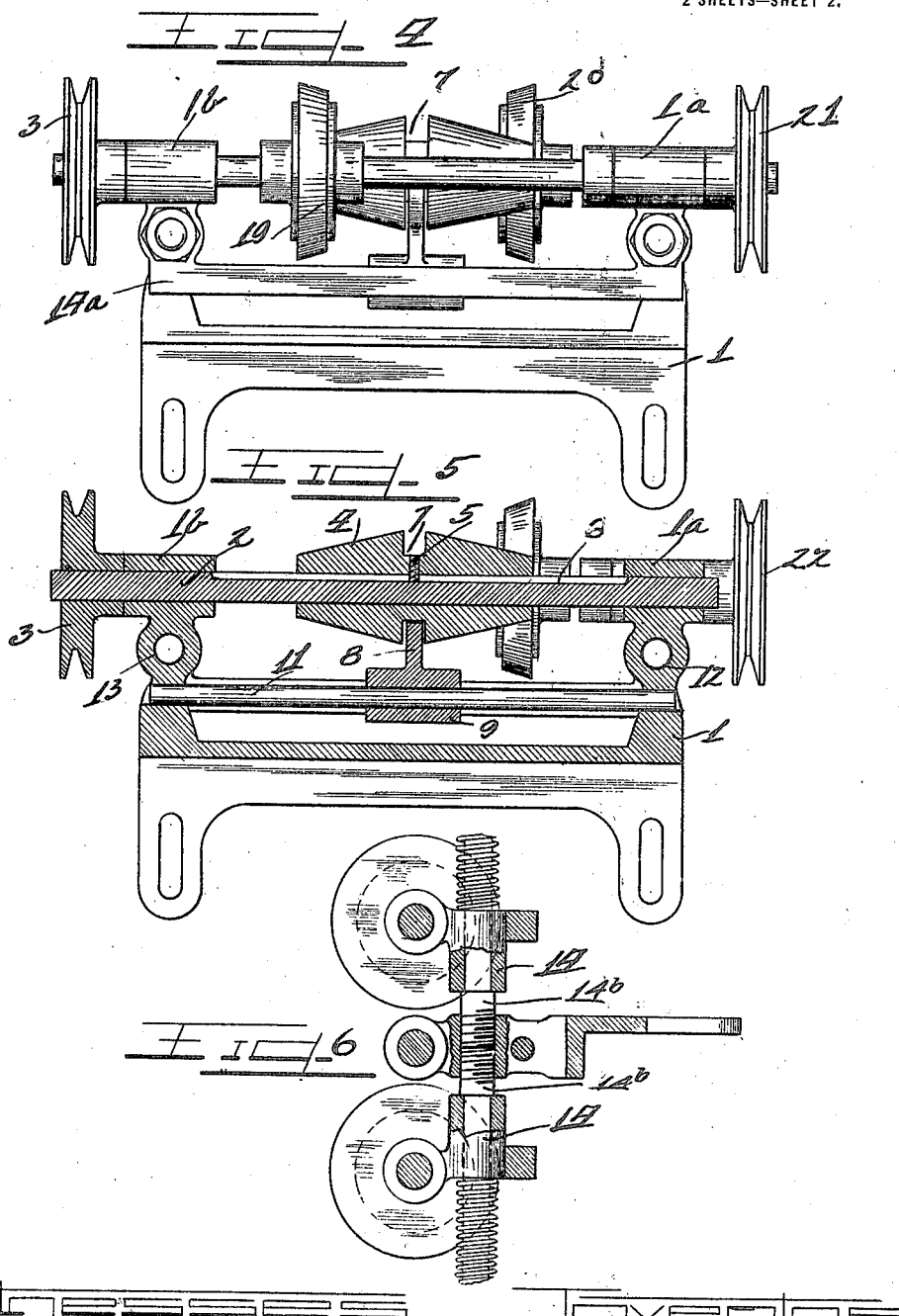

1,431,649

UNITED STATES PATENT OFFICE.

LEROY D. GILLETTE, OF GALESBURG, ILLINOIS, ASSIGNOR OF ONE-HALF TO RAE A. TENNERY, OF GALESBURG, ILLINOIS.

VARIABLE-SPEED GEARING.

Application filed June 27, 1921. Serial No. 480,555.

*To all whom it may concern:*

Be it known that I, LEROY D. GILLETTE, a citizen of the United States, and a resident of the city of Galesburg, in the county of Knox and State of Illinois, have invented certain new and useful Improvements in a Variable-Speed Gearing; and I do hereby declare that the following is a full, clear, and exact description of the same, reference being had to the accompanying drawings, and to the numerals of reference marked thereon, which form a part of this specification.

This invention has reference more particularly to a novel friction drive mechanism in which driven shafts are yieldingly held in engagement with the driving shaft.

It is an object of my invention to construct a friction drive in which the surfaces of the friction driving member have a sufficiently long bevel to prevent relative slipping between it and the driven friction wheels.

It is a further object of this invention to mount the driven shafts so that they may slide with their mountings and may be yieldingly held in operative engagement.

Other objects and advantages exist in the compact, novel construction and arrangement which will be more specifically pointed out hereinafter.

On the drawings:

Figure 1 represents a plan view of this novel friction drive.

Figure 2 is an end view thereof.

Figure 3 is a section on the line 3—3 of Figure 1.

Figure 4 is a front elevation of this device.

Figure 5 is a section on the line 5—5 of Figure 1.

Figure 6 is a section on the line 6—6 of Figure 1.

As shown on the drawings:

Referring more particularly to the drawings in which similar reference characters denote similar parts in the same or different views thereof, the numeral 1 designates a central support having journal lugs $1^a$ and $1^b$ in which the driving shaft 2 is journaled. Upon one end of the driving shaft, a driving pulley 3 is secured. Intermediate of the ends of said driving shaft, a driving friction gear 4 having a reversely sloping surface is positioned. A key or spline 5 is secured in said friction gear for slidingly securing said gear in a longitudinal groove 6 in said driving shaft. It will be noted that the driving friction gear has a very gradually tapering surface, and when in operative relation with a driving gear, there is consequently very little tendency to slide the driving gear, since the force component producing a longitudinal thrust is negligibly small. The central portion of said gear has a deep groove 7 in which is loosely mounted the yoke member 8 having a hub 9 which has a sliding fit upon a supporting rod 11. A lug or handle 10 may be conveniently secured to the hub 9 of said yoke member for the purpose of more readily adjusting the friction gear.

The central frame member has a pair of journal bearings in proximity to the aforesaid bearing lugs in which transversely arranged shafts or rods 12 and 13 are mounted. Each shaft or rod 12 and 13 comprises a pair of sections, each section having an enlarged screw-threaded end adjustable in the central support 1 as shown in Figure 6; the outer ends of these enlargements forming abutments $14^a$. Upon each of said shafts 12 and 13 there are slidingly mounted a pair of journal bracket members 14 that abut the enlargements or abutments $14^b$ on shafts 12 and 13 when said parts are in the position shown in the drawing, and prevent the gears 19 and 20 from contacting the cone 4 until the gears are shifted. Each bracket comprises a transverse journal bearing 16 and a longitudinal bearing 15. The transverse shafts extend through the journal bearings 16 and the journal bearings 15 are in longitudinal alignment for supporting a pair of longitudinally arranged shafts 17 and 18. The brackets 14 have a free sliding movement on the transverse shafts. A spring 23 is secured on each end of each of said transverse shafts by means of a nut 24. These springs exert a yielding force against said journal brackets and tend to keep the friction gears 19 and 20, which are mounted upon said shafts 17 and 18 respectively, in operative relation with driving gear 4, if either gear is in operative relation with said driving gear. Beneath each of the shafts 17 and 18 runs a longitudinal beam $14^a$ which may be integral with the said brackets and which keeps the respective journal brackets from longitudinal movement. Upon the right hand ends of shafts 17 and 18, pulleys 21 and 22 are respectively mounted. Belts 24 and 25 may be respectively applied to these pulleys for deriving power therefrom.

It should be particularly noted that in my improved form of gearing, it is possible for me to obtain a single drive or a double drive and that either can be quickly rendered inoperative by shifting its gear to inoperative position. And in the case belts are used for transmitting the power, it will be necessary to merely twist or cross one belt to get a reverse drive.

The device may also be arranged so that the shifting of shafts 17 or 18 will advantageously vary the tension of the belts 24 or 25 respectively.

The operation is as follows:

In the operation of my improved gearing, power from any source is applied to the pulley 3 for rotating the friction gear 4. In the position shown in Figure 1 it will be observed that the friction gears 19 and 20 are not in operative relation with the drive gear. If it is desired to impart rotation to driven shaft 17, the friction gear 4 is slid by means of yoke member 8 into operative relation with the gear 19 mounted upon shaft 17. If it is desired to vary the speed at any time, it would only be necessary to shift the driving gear 4 further to the left during which operation shaft 17 will slide outwardly against the tension of the two springs 23 acting against the journal brackets. If it is desired to operate shaft 18, the driving gear 4 is shifted in the opposite direction, or to the right, whereby a similar variable driving relation may be established with gear 20.

It will accordingly be seen that I have invented a single and double friction drive in which a pair of parallel shafts may be successively rotated and in which the driven shafts are yieldingly held in engagement with the driving gears. It should also be noted that if the load exceeds the tension of the springs 23 to a sufficient extent, it will yield, thereby preventing any breakage of the friction gears.

I am aware that numerous details of construction may be varied through a wide range without departing from the principles of this invention, and I therefore do not purpose limiting the patent granted otherwise than necessitated by the prior art.

I claim as my invention:

1. In a device of the class described, a plurality of transversely arranged shafts, journal bearings slidably mounted upon said shafts, a longitudinal driven shaft in said journal bearings, a friction gear secured on said shaft, a slidingly mounted friction driving gear in driving relation with said friction gear, and yielding means mounted upon said transversely arranged shafts for urging said driven shaft against said slidingly mounted friction driving gear.

2. In a device of the class described, a pair of transverse rods, a pair of journaled brackets slidably mounted on each of said rods, a pair of longitudinally arranged driven shafts having friction gears thereon journaled in said journal brackets, a driving shaft mounted intermediate of said driven shafts, a friction gear slidingly mounted on said driving shaft and adapted to be shifted into operative relation with either of said first-mentioned friction gears, and a pair of springs upon each transverse rod for urging the driven gears toward said driving gear.

In testimony whereof I have hereunto subscribed my name in the presence of two subscribing witnesses.

LEROY D. GILLETTE.

Witnesses:
RAE TENNERY,
ALICE TRASK.